(12) United States Patent
Ohyama et al.

(10) Patent No.: US 6,873,481 B2
(45) Date of Patent: Mar. 29, 2005

(54) DISK APPARATUS INCLUDING DETECTION OF DISK CLAMPING OPERATION

(75) Inventors: Iwao Ohyama, Iwaki (JP); Masatoshi Ito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 159 days.

(21) Appl. No.: 10/341,313

(22) Filed: Jan. 13, 2003

(65) Prior Publication Data

US 2003/0156508 A1 Aug. 21, 2003

(30) Foreign Application Priority Data

Jan. 16, 2002 (JP) ........................................ 2002-007518

(51) Int. Cl.[7] ........................ G11B 21/08; G11B 7/085
(52) U.S. Cl. ................................................ 360/30.85
(58) Field of Search ........................... 369/30.85, 30.7, 369/30.78, 30.6, 30.48, 30.31, 30.32, 30.27, 30.36, 184, 187, 30.24; 360/98.06, 99.02, 99.06; 720/628, 620, 621, 622, 623

(56) References Cited

U.S. PATENT DOCUMENTS 5,163,040 A * 11/1992 Hake ........................... 369/204
6,097,693 A    8/2000 Nakamichi ................ 369/270.1
6,288,982 B1   9/2001 Kato ......................... 369/30.36

* cited by examiner

*Primary Examiner*—Julie Anne Watko
(74) *Attorney, Agent, or Firm*—Brinks Hofer Gilson & Lione

(57) ABSTRACT

A disk apparatus includes a disk guide member, a disk transfer mechanism, a disk rotating section, a disk clamp mechanism, and a control section. The guide member has a pair of detectors arranged in the disk transfer direction with a predetermined distance therebetween so as to be brought into a detection state by a peripheral edge of a disk when the disk reaches such a position as to be clamped by the disk rotating section. The control section operates the disk clamp mechanism so that the disk rotating section is urged toward the disk when one of the detectors is brought into a detection state during the transfer of the disk, determines that a clamping operation of the disk is completed when both of the detectors are in a detection state and the detection state continues for a predetermined time, and then stops the disk transfer mechanism.

17 Claims, 10 Drawing Sheets

DISK APPARATUS INCLUDING DETECTION OF DISK CLAMPING OPERATION

BACKGROUND OF THE INVENTION

1. Field of the Invention

The present invention relates to a disk apparatus in which a disk is transferred to a rotating section by a transfer mechanism, and more particularly, to a disk apparatus in which a disk can be reliably clamped in a rotating section.

2. Description of the Related Art

Car-mounted disk apparatuses and the like adopt so-called slot-in loading, in which a disk inserted from a loading slot of the apparatus is pulled into the apparatus and transferred to a rotating section by a transfer mechanism.

In the disk apparatuses having a stopper, however, since the peripheral edge of the transferred disk necessarily abuts the stopper, it is scratched easily. Moreover, the stopper must recede so as not to touch the peripheral edge of the rotating disk after the center hole of the disk is clamped by the rotating section. This complicates the inner structure of the apparatus.

In a disk apparatus in which both a large-diameter disk having a diameter of 12 cm and a small-diameter disk having a diameter of 8 cm can be loaded, the stopper must be selectively moved to one position to position the small-diameter disk relative to the driving section and another position to position the large-diameter disk relative to the driving section. This also complicates the inner structure of the apparatus.

In another type of disk apparatus, a disk inserted from a loading slot passes through a rotating section and is stored in a stock section provided behind the rotating section. When a stopper for positioning the disk relative to the rotating section is provided in such a disk apparatus, it is placed on the transfer path for the disk, and therefore, a mechanism for causing the stopper to recede from the transfer path is needed.

A further type of disk apparatus is possible which utilizes an optical sensor or a mechanical switch for detecting that the center hole of a carried disk is aligned with the center of rotation of a rotating section without using the stopper, and in which a transfer mechanism is stopped in response to the operation of the optical sensor or the mechanical switch. However, when the optical sensor is used, the cost of the apparatus is increased, and incorrect operation may be caused by a transparent portion of the disk or external light. Furthermore, since the diameter varies among disks, it is considerably difficult for the optical sensor or the mechanical switch to precisely detect that the center hole of the disk is aligned with the rotating section.

SUMMARY OF THE INVENTION

The present invention has been made to overcome the above problems, and an object of the present invention is to provide a disk apparatus in which a disk can be reliably placed in such a position as to be clamped in a rotating section, without providing a mechanical stopper on a transfer path of the disk.

In order to achieve the above object, according to one aspect, the present invention provides a disk apparatus including a guide member extending in a disk transfer direction so as to guide a disk to be transferred, a transfer mechanism for applying a transfer force to the disk, a rotating section to be fitted in a center hole of the disk transferred by the transfer mechanism so as to apply a rotating force to the disk, a clamp mechanism for fitting the rotating section in the center hole of the disk, and a control section for controlling the operation of said disk apparatus. The guide member has a pair of detectors arranged in the disk transfer direction with a predetermined distance therebetween so as to be brought into a detection state by a peripheral edge of the disk when the disk reaches such a position as to be clamped by the rotating section. The control section operates the clamp mechanism so that the rotating section is urged toward the disk when one of the detectors is brought into a detection state during the transfer of the disk, determines that a clamping operation of the disk is completed when both of the detectors are in a detection state and the detection state continues for a predetermined time, and stops the transfer mechanism in response to this determination.

In this disk apparatus, when a state is detected in which the center of the disk is slightly deviated from the rotating section, more transfer force is applied to the disk by pressing the rotating section against the disk. Therefore, when the center of the disk is aligned with the center of rotation of the rotating section, the disk is clamped by the rotating section by itself. Moreover, since it is determined by a combination of detecting operations of the two detectors whether or not the center hole of the disk is clamped by the rotating section, the completion of the clamping operation can be precisely detected.

Preferably, the control section reverses the transfer direction of the transfer mechanism at least once after it recognizes that both the detectors are actuated, and determines that the clamping operation of the disk is completed when the detectors are continuously actuated for a predetermined time.

This makes it possible to more reliably detect that the center hole of the disk is fitted on the rotating section.

Preferably, a retry for reversing the transfer direction of the transfer mechanism at least once is performed when one of the detectors is brought into a detection state during the transfer of the disk and both the detectors are not actuated within a predetermined time after the rotating section is urged toward the disk.

By performing the retry, even when a clamping error occurs, the probability that the clamping operation can be completed can be increased.

In the disk apparatus, the transfer mechanism may transfer a disk loaded from a loading slot toward the rotating section, or may transfer a disk, which is selected from a plurality of disks stored in a stock section provided in the disk apparatus, toward the rotating section.

As described above, since the disk is moved on the rotating section in a state in which the rotating section is urged toward the disk, the center hole of the disk can be reliably clamped on the rotating section. Furthermore, since two detection switches are used, the rotating section can be pressed against the disk when the center hole of the disk moves close to the rotating section, and it can be precisely detected later whether or not the center hole is fitted on the rotating section.

Therefore, a stopper for positioning the disk relative to the rotating section is unnecessary, unlike before, and a mechanism for causing the stopper to recede is also unnecessary. Even when the loading slot, the transfer mechanism, the rotating section, and the stock section are arranged in order in the disk apparatus, a disk loaded from the loading slot and a disk withdrawn from the stock section can be reliably clamped on the rotating section.

Further objects, features, and advantages of the present invention will become apparent from the following description of the preferred embodiments with reference to the attached drawings.

DESCRIPTION OF THE PREFERRED EMBODIMENTS

Figure 1:
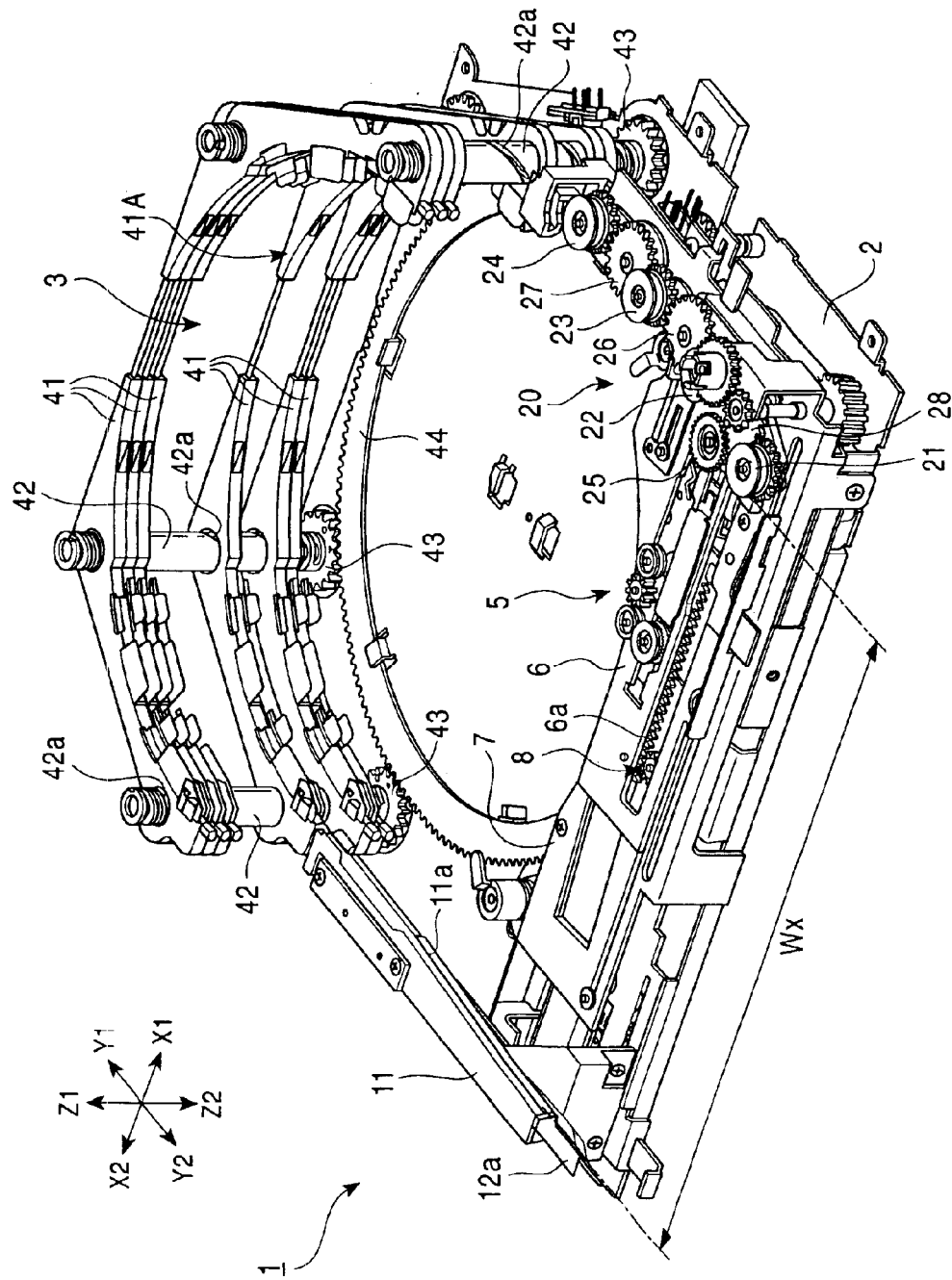
FIG. 1 is a perspective view showing the principal part of a disk apparatus according to the present invention.
Figure 2:
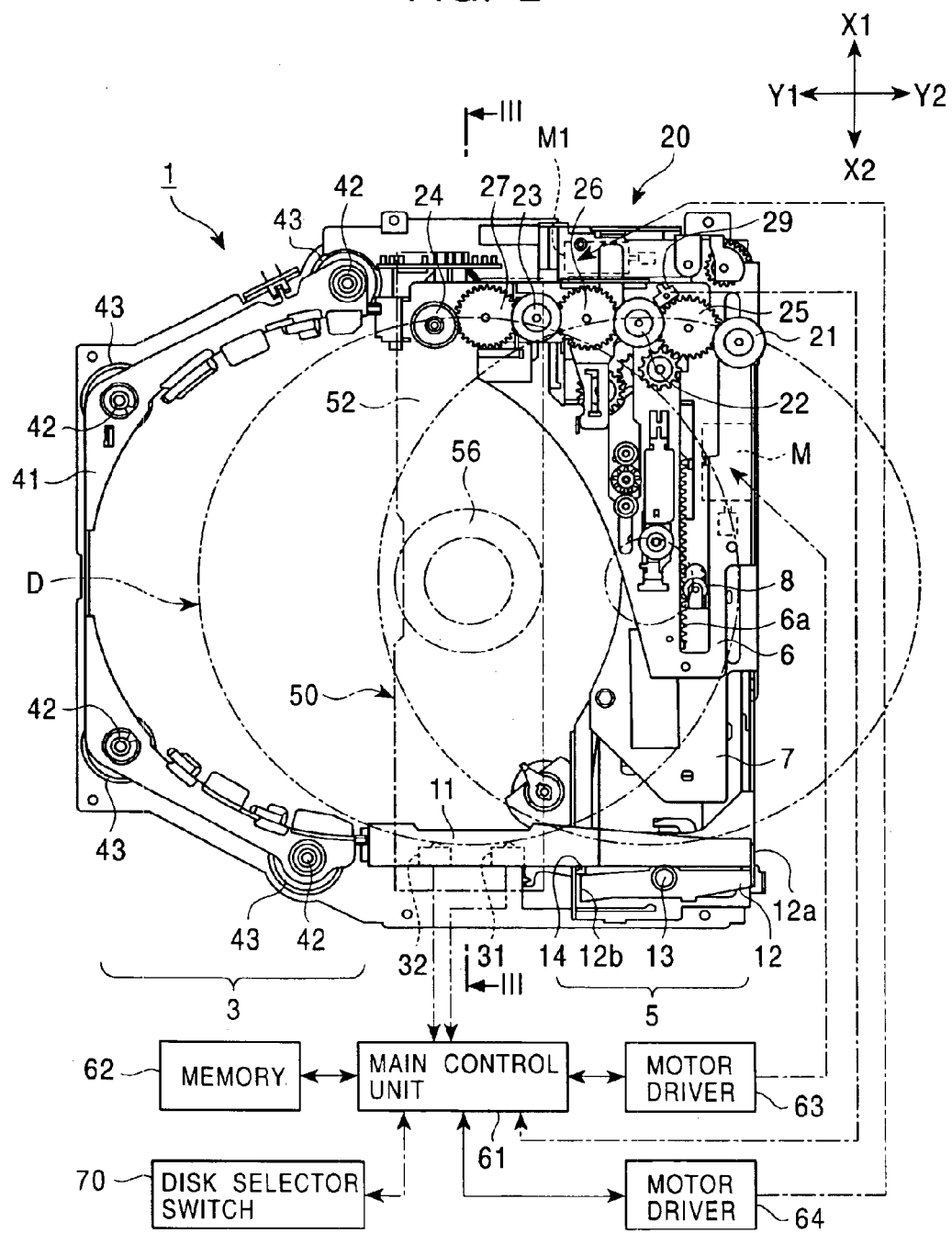
FIG. 2 is a plan view of the disk apparatus.
Figure 11:
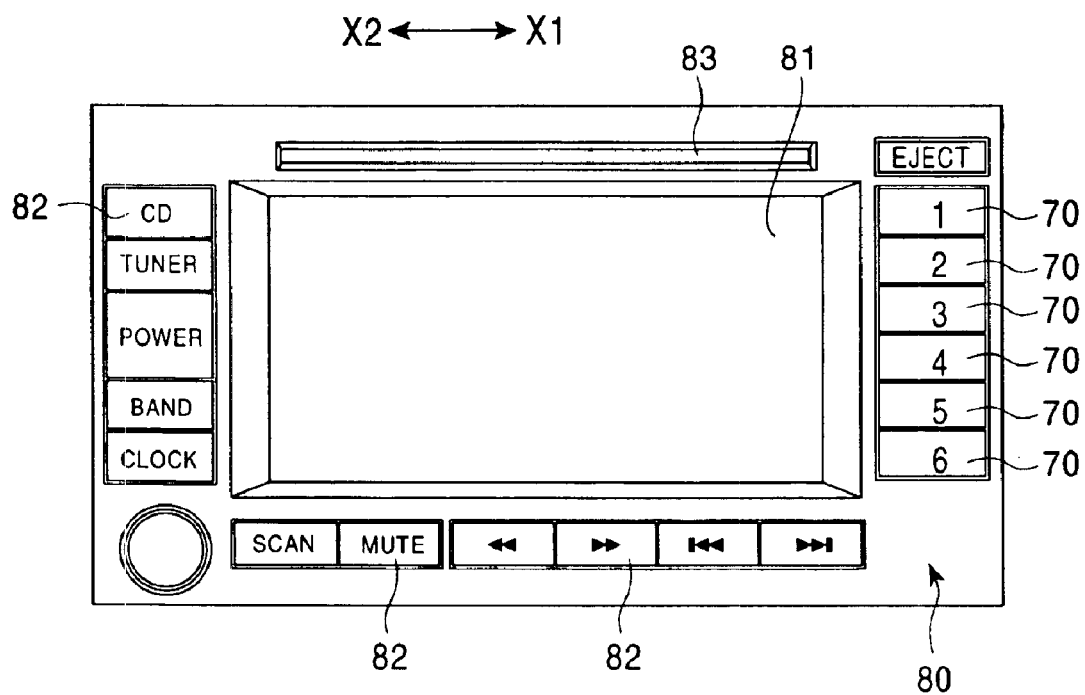
FIG. 11 is a front view of the disk apparatus of the present invention.

A disk apparatus 1 shown in FIGS. 1 and 2 is capable of playback of and/or recording on small-diameter disks having a diameter of 8 cm and large-diameter disks having a diameter of 12 cm, such as CDs (compact disks) or DVDs (digital versatile disks). A plurality of disks of 12 cm in diameter can be stored inside the disk apparatus 1, and one of the disks is selected for driving. As shown in FIG. 11, a face section 80 having a liquid crystal display panel 81 and various switches 82 is provided on the front side (Y2-side) of the main body of the disk apparatus 1. The face section 80 also has a loading slot 83 extending in the widthwise direction (X1–X2 direction).

A stock section 3 in which a plurality of large-diameter disks can be stacked in the axial or height direction (Z-direction) is disposed on the back side (Y1-side) of the disk apparatus 1. The disks are held in disk holders 41 of the stock section 3, respectively, and are stored while being stacked in the axial direction.

As shown in FIGS. 1 and 2, a disk transfer section 5 is disposed on the Y2-side of the disk apparatus 1 between the loading slot 83 of the face section 80 and the stock section 3 so as to carry a disk D into and out of the disk apparatus 1. In the disk transfer section 5, a first moving member 6 and a second moving member 7 are disposed on a base 2 so that they are movable in the widthwise direction (X1–X2 direction).

The first moving member 6 has a rack 6a, and the second moving member 7 has a rack opposing the rack 6a. A connecting gear 8 is disposed as a distance setting section on the base 2, and is rotationally driven by a setting motor M shown in FIG. 2. The connecting gear 8 is meshed with both the rack 6a of the first moving member 6 and the rack of the second moving member 7. When the connecting gear 8 is rotated by the setting motor M, the first moving member 6 and the second moving member 7 synchronously move closer to each other or further apart from each other.

Figure 3A:
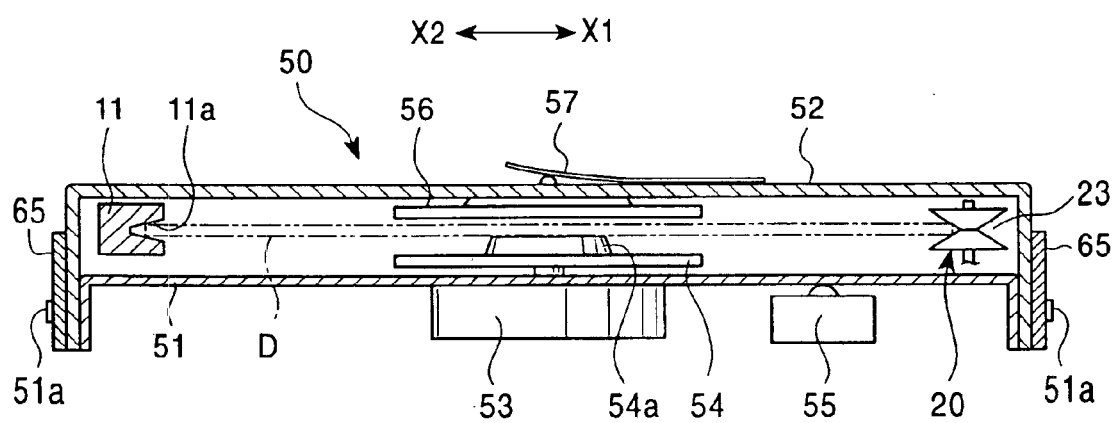
FIG. 3A is a cross-sectional view taken along line III—III in FIG. 2.

The second moving member 7 is provided with a guide member 11 that extends in the Y1–Y2 direction serving as the loading and ejecting direction of the disk D. A guide groove 11a extending in the Y-direction is formed on the X1-side face of the guide member 11. As shown in FIG. 3A, the cross section of the guide groove 11a is shaped like the letter V that opens wide on the X1 side and is narrow on the X2 side.

A detection arm 12 is provided at an ejection-side (Y2-side) end of the guide member 11. The detection arm 12 is supported so that it can turn about a shaft 13 clockwise and counterclockwise in FIG. 2, and is urged counterclockwise by an urging member (not shown).

The detection arm 12 has a detection piece 12a bent at the ejection-side end of the guide member 11. When the detection piece 12a is pushed outward (in the X2-direction) by the peripheral edge of a disk D inserted in the guide groove 11a of the guide member 11, the detection arm 12 turns clockwise.

A pressing piece 12b bent below the plane of the figure is formed at the other end of the detection arm 12, and opposes an actuator of a detection switch 14. When the detection arm 12 is turned clockwise, the detection switch 14 is turned on by the pressing piece 12b.

In a state in which the detection arm 12 is turned counterclockwise and the detection piece 12a covers the ejection-side (Y2-side) end of the guide groove 11a of the guide member 11, the pressing piece 12b separates from the actuator of the detection switch 14, thereby turning the detection switch 14 off.

A transfer mechanism 20 including first to fourth transfer rollers 21, 22, 23, and 24 that are arranged in the loading and ejecting direction (Y-direction) of the disk D is provided on the surface of the first moving member 1 so as to face the guide member 11. As shown in FIG. 3A, each of the first to fourth transfer rollers 21, 22, 23, and 24 have flanges whose thickness gradually decreases from the center toward the outer peripheral side, and the edge of the disk D is held in a V-groove formed between the flanges.

A carrier motor M1 is provided in the disk apparatus 1. The power of the carrier motor M1 is reduced in speed by a reduction gear train, and is transmitted to the transfer rollers 21, 22, 23, and 24 through transmission gears 25, 26, and 27 and the like, thereby rotating the first to fourth transfer rollers 21, 22, 23, and 24 in the same direction. When the first to fourth transfer rollers 21, 22, 23, and 24 are rotated clockwise in FIG. 2, the disk D is carried into the inner portion of the apparatus (in the Y1-direction). When the first to fourth transfer rollers 21, 22, 23, and 24 are rotated counterclockwise, the disk D is carried outward (in the Y2-direction).

As shown in FIG. 1, the first moving means 6 is provided with a pivot arm 28 that can pivot on a support shaft within a predetermined angular range, and the first transfer roller 21 is supported at the leading end of the pivot arm 28. The pivot arm 28 is constantly urged clockwise by an urging member such as a tension coil spring. A detection switch 29 is provided on the first moving member 6 so that it is turned on when the pivot arm 28 pivots counterclockwise by a predetermined angle.

The detection switch 14 and the detection switch 29 constitute a loading detector that detects the loading and ejection of the disk into and out of the disk apparatus 1.

A linear position sensor is disposed on the base 2 so as to detect the X-direction moving position of the second moving member 7. The linear position sensor is, for example, a linear variable resistor, and can detect the position of the second moving member 7 on the basis of the resistance that linearly changes, and as a result, can detect the opposing distance Wx between the guide member 11 and the transfer mechanism 20.

As shown in FIG. 2, the guide member 11 has a first detection switch 31 and a second detection switch 32. The first detection switch 31 and the second detection switch 32 function as a pair of detectors that detect the movement of the disk D to a position where it can be clamped.

Figure 5:
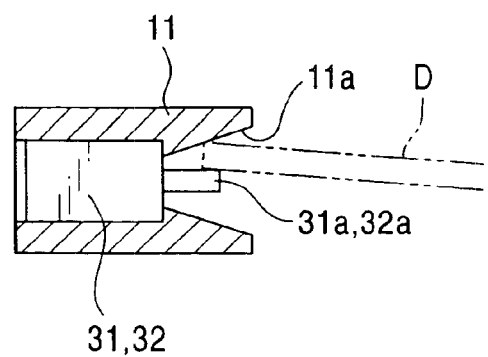
FIG. 5 is a cross-sectional view showing the relationship between a guide groove of a guide member and a detection switch.

FIG. 5 is a cross-sectional view of a portion of the guide member 11 in which the first or second detection switch 31 or 32 is provided. As shown in FIG. 5, an actuator 31a or 32a of the first detection switch 31 or the second detection switch 32 projects into the guide groove 11a of the guide member 11. When the actuator 31a or 32a is pressed by the peripheral edge of the disk that is moving in the guide groove 11a, the first detection switch 31 or the second detection switch 32 is turned on (detection state).

The stock section 3 has a plurality of disk holders 41 (six in FIG. 1) vertically stacked in the axial direction of a large-diameter disk D having a diameter of 12 cm, and each of the disk holders 41 holds the front edge of a large-diameter disk D that is carried therein while being clamped by the guide member 11 and the transfer mechanism 20.

A plurality of guide columns 42 vertically stand on the base 2, and are rotatably supported. Pinions 43 are fixed to the base ends of all the guide columns 42, respectively, and a ring-shaped gear 44 is disposed on the base 2 so as to be meshed with the pinions 43. When the ring-shaped gear 44 is driven by a selection motor (not shown), all the guide columns 42 are rotated synchronously.

A screw groove 42a is formed on the outer periphery of every guide column 42. The pitch of the screw groove 42a is small in the upper and lower portions of the guide column 42, and is large in the center portion. A plurality of circular insertion holes are formed in the disk holders 41, and a projection is formed on the inner surface of each insertion hole so as to be meshed with the screw groove 42a of the guide column 42. When the guide columns 42 are rotated, the disk holders 41 are vertically moved because of the screw grooves 42a.

Since the pitch of the screw grooves 42a is small in the upper and lower portions of the guide columns 42, as described above, the disk holders 41 are stored so that they are tightly stacked in the upper and lower portions. Since the pitch of the screw grooves 42a is large in the center potions of the guide columns 42, the disk holders 41 can vertically move apart from the disk holders 41 vertically adjacent thereto. With the vertical movement of the disk holders 41, any one of the disk holders 41 can be selected. As shown in FIG. 1, a selected disk holder 41A stops at the same height as the guide member 11 and the transfer mechanism 20.

In this way, a plurality of disk holders 41 and a driving section composed of the guide columns 42, the pinions 43, the ring-shaped gear 44, and the selection motor (not shown) so as to vertically drive the disk holders 41 constitute a disk selecting section.

A driving unit 50 is provided on the base 2. As shown in FIG. 3A, the driving unit 50 includes a driving chassis 51 and a clamp chassis 52. The driving chassis 51 and the clamp chassis 52 are combined in parallel with each other so as to move closer to or further apart from each other. The driving chassis 51 is placed below the transfer path of the disk D defined by the guide member 11 and the transfer mechanism 20, and the clamp chassis 52 is placed above the transfer path.

The driving chassis 51 has a spindle motor 53 on the lower side, and a turntable 54 to be rotated by the spindle motor 53 on the upper side. In this embodiment, the turntable 54 serves as the rotating section for rotating a disk D. An optical head 55 is provided below the driving chassis 51. The optical head 55 applies laser light for playback from or recording to the disk D through a cut-out formed in the driving chassis 51, and moves over the recording surface of the disk D. A clamper 56 is rotatably supported by the clamp chassis 52, and is urged downward by a leaf spring 57.

A clamp mechanism 66 is provided on the driving chassis 51 or the clamp chassis 52 of the driving unit 50, or on the base 2, and the driving chassis 51 and the clamp chassis 52 are vertically moved relative to one another by the clamp mechanism 66. When the distance between the driving chassis 51 and the clamp chassis 52 is large, a space is formed between the turntable 54 and the clamper 56 through which the disk D can move. When the driving chassis 51 and the clamp chassis 52 are moved closer to each other in a state in which the disk D is placed therebetween, the clamper 56 clamps the disk D between the clamper 56 and the turntable 54 by the force of the leaf spring 57.

Figure 3B:
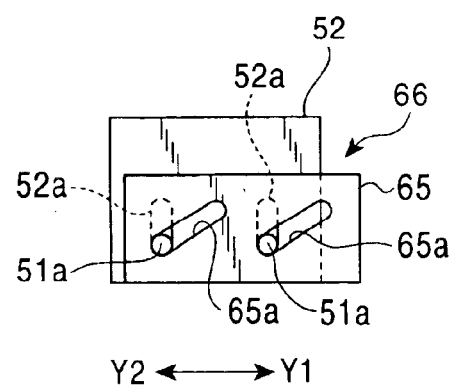
FIG. 3B is a side view of a driving unit.

FIG. 3B shows an example of a structure of the clamp mechanism 66. Sliding members 65 that can reciprocally move within a predetermined range in the Y1-Y2 direction are placed on both sides of the clamp chassis 52, respectively. Pins 51a that protrude from each side face of the driving chassis 51 through slots 52a of the clamp chassis 52 are passed through a pair of inclined cam grooves 65a formed in each of the sliding members 65, respectively. The driving chassis 51 is moved down because of the inclined cam grooves 65a when the sliding members 51 move in the Y1-direction, and is moved up when the sliding members 65 move in the Y2-direction. The sliding members 65 are moved in the Y1-Y2 direction by the driving force of a motor provided on a moving base (not shown) that supports the driving unit 50 movably in the Y1-Y2 direction.

FIG. 2 shows a state in which the driving unit 50 has been moved to a driving position. A disk D is clamped and rotated by the driving unit 50 that stops at the driving position shown in FIG. 2. When the disk holders 41 of the stock section 3 are vertically moved in order to select a desired disk, the driving unit 50 recedes toward the loading side (Y2-side) so that it does not touch disks moving up and down along with the disk holders 41.

The setting motor M for moving the first moving member 6 and the second moving member 7 so as to set the opposing distance Wx therebetween is driven by a motor driver 63; and the carrier motor M1 for rotating the transfer rollers 21, 22, 23, and 24 is driven by a motor driver 64. The motor drivers 63 and 64 are controlled by a main control unit (control section) 61 such as a CPU. The above-described motor for driving the clamp mechanism 66 also is driven by the main control unit 61. Detection output from the linear position sensor that detects the moving position of the second moving member 7 is applied to the main control unit 61. Detection outputs from the detection switches 14 and 29 and detection outputs from the first detection switch 31 and the second detection switch 32 in the guide member 11 are also applied to the main control unit 61.

A memory 62, such as a RAM, is connected to the main control unit 61. The memory 62 stores information, for example, which disk holder 41 of the disk holders 41 holds the desired disk D.

Operation of the disk apparatus 1 will now be described.

In the disk apparatus 1, when the connecting gear 8 is driven by the setting motor M, the first moving member 6 and the second moving member 7 synchronously move in the X-direction. As a result, the opposing distance Wx between the guide member 11 and the transfer mechanism 20 is determined. In a standby state in which loading of a disk D is awaited, the opposing distance Wx between the guide member 11 and the transfer mechanism 20 is set to be smaller than the diameter of a small-diameter disk (8 cm).

By operating any one of the disk selector switches 70 provided in the face section 80 (see FIG. 11) when loading a disk, the transfer rollers 21, 22, 23, and 24 of the transfer mechanism 20 are rotated in the direction to carry the disk in. When one of the detection arm 12 and the pivot arm 28 is pushed outward by the peripheral edge of the disk loaded from the loading slot 83 and one of the loading-detecting switches 14 and 29 is turned on, the main control unit 61 determines that the disk is being loaded.

When it is determined that the disk is being loaded, the setting motor M is driven, the first moving member 6 and the second moving member 7 move further apart from each other so as to increase the distance therebetween so that the opposing distance Wx between the guide member 11 and the transfer mechanism 20 allows a small-diameter disk having a diameter of 8 cm to be clamped and transferred. The setting of the opposing distance Wx is controlled by detecting the moving position of the second moving member 7 with the linear position sensor.

In this case, the opposing distance Wx is set so that one of the detection arm 12 and the pivot arm 28 is pushed outward and so that only one of the loading-detecting switches 14 and 29 is turned on. Therefore, the main control unit 61 determines that the loaded disk is a small-diameter disk unless both the loading-detecting switches 14 and 29 are simultaneously turned on, and the opposing distance Wx between the guide member 11 and the transfer mechanism 20 is fixed so that the small disk can be clamped and transferred.

Then, the small-diameter disk is carried into the disk apparatus 1 by the clockwise rotating force of the transfer rollers 21, 22, 23, and 24 of the transfer mechanism 20. In this case, the disk rolls in the Y1-direction along the guide groove 11a of the guide member 11.

When the small-diameter disk is loaded, it is not carried to the position at which it is held by the disk holder 41 of the stock section 3, but is carried to the position at which it can be driven by the driving unit 50 at the driving position, as shown by the one-dot chain phantom circle in FIG. 2. By monitoring the operating states of the first detection switch 31 and the second detection switch 32 by the main control unit 61, it is detected that the small-diameter disk has been transferred to the position of driving by the driving unit 50.

Figure 6:
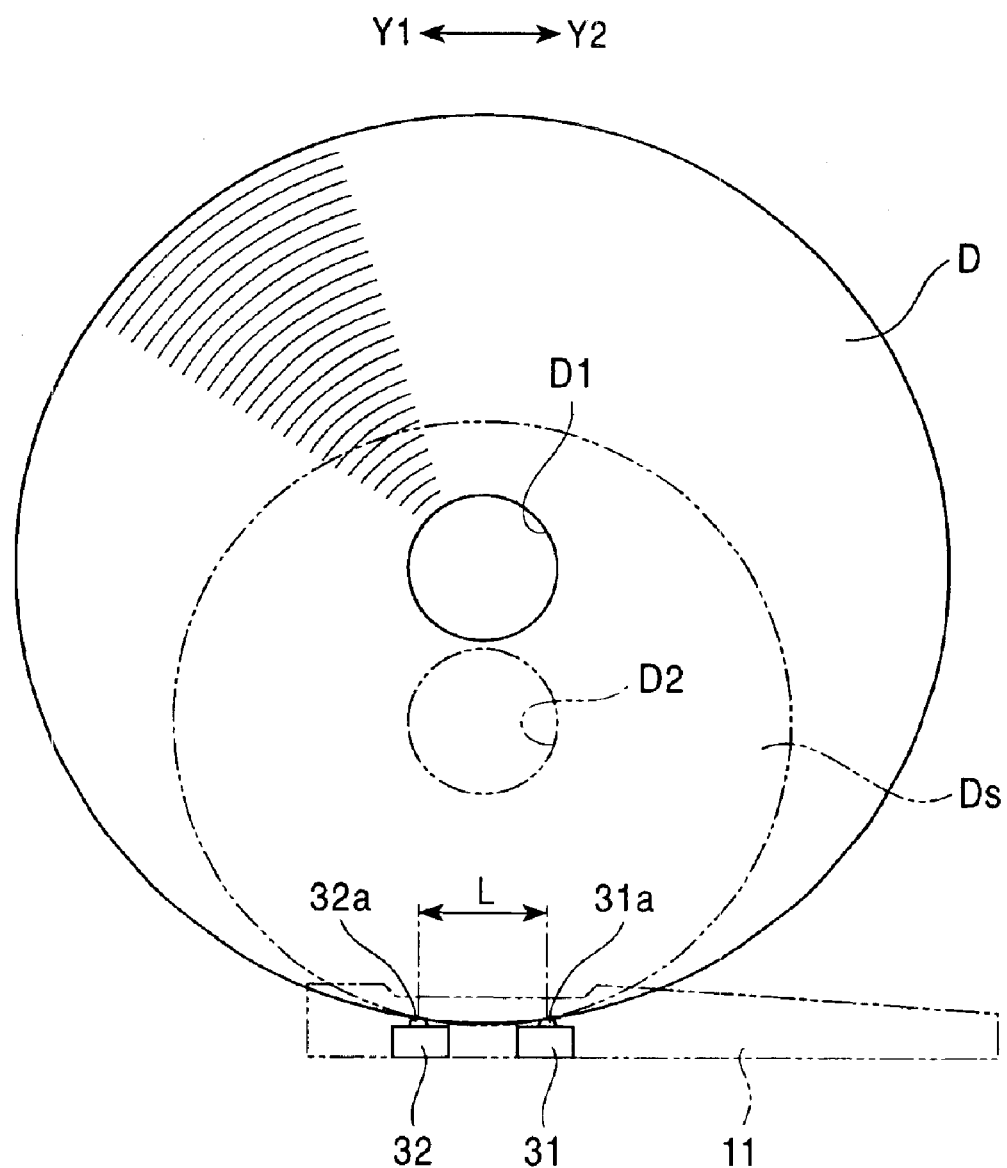
FIG. 6 is a plan view showing the relationship between large-diameter and small-diameter disks and first and second detection switches.

FIG. 6 shows the relationship among a small-diameter disk Ds having a diameter of 8 cm, the first detection switch 31 and the second detection switch 32. The actuator 31a of the first detection switch 31 and the actuator 32a of the second detection switch 32 are arranged in the disk transfer direction with a distance L therebetween. The distance L is determined so that the actuators 31a and 32a are simultaneously pressed by the peripheral edge of the small-diameter disk Ds when a center hole D2 of the small-diameter disk Ds is aligned with the center of rotation of the turntable 54, in a plan view (as viewed from above).

Therefore, when both the actuator 31a of the first detection switch 31 and the actuator 32a of the second detection switch 32 are pressed by the peripheral edge of the small-diameter disk Ds and both the first detection switch 31 and the second detection switch 32 are brought into an ON state (detection state), the main control unit 61 determines that the center of the small-diameter disk Ds is aligned with the center of rotation of the turntable 54, that is, that the small-diameter disk Ds is placed in such a position as to be clamped on the turntable 54, thereby executing control to stop the driving of the transfer mechanism 20.

Subsequently, the small-diameter disk Ds is clamped between the turntable 54 and the clamper 56, and is rotated by the driving force of the spindle motor 53. Information recorded on the small-diameter disk Ds is reproduced from, or information is recorded on, the small-diameter disk Ds by the optical head 55.

After the playback or recording operation, the small-diameter disk Ds is transferred in the Y2-direction toward the loading slot 83 of the face section 80 by the guide member 11 and the transfer mechanism 20. When the small-diameter disk Ds is ejected, the operation states of the loading-detecting switches 14 and 29 are monitored by the main control unit 61. When one of the loading-detecting switches 14 and 29 is turned on and then is turned off, the transfer rollers 21, 22, 23, and 24 are stopped, and the small-diameter disk Ds is stopped in a state in which a part thereof protrudes from the loading slot 83.

Control operation to be performed when a large-diameter disk D having a diameter of 12 cm is loaded will now be described. As described above, when a disk is not loaded, the opposing distance Wx between the guide member 11 and the transfer mechanism 20 is set to be smaller than when a small-diameter disk Ds is carried. When a disk is loaded, one of the detection arm 12 and the pivot arm 28 is pushed outward, and one of the loading-detecting switches 14 and 29 is turned on, so it is determined that the disk is being loaded. Then, the setting motor M starts to increase the distance between the first moving member 6 and the second moving member 7. In this case, first, the opposing distance Wx is set so as to allow a small-diameter disk Ds having a diameter of 8 cm to be carried.

In a case in which a large-diameter disk D having a diameter of 12 cm is being loaded, immediately after it starts to be pulled in by the transfer rollers 21, 22, 23, and 24 of the transfer mechanism 20, the detection arm 12 and the pivot arm 28 are simultaneously pushed outward by the peripheral edge of the disk D. Consequently, both the loading-detecting switches 14 and 29 are turned on. At this time, the main control unit 61 determines that the large-diameter disk D is being loaded. That is, the two loading-detecting switches 14 and 29 that constitute the loading-detection section also function as a disk-diameter distinguishing section for distinguishing whether the loaded disk is a large-diameter disk D or a small-diameter disk Ds.

Immediately after that, the setting motor M starts again, the first moving member 6 and the second moving member 7 move farther apart from each other, and the opposing distance Wx between the guide member 11 and the transfer mechanism 20 is set so that the large-diameter disk D can be clamped and a transfer force can be applied thereto. The opposing distance Wx is set by monitoring the output from the linear position sensor by the main control unit 61. Then, the large-diameter disk D is carried in the Y1-direction by the rotating force of the transfer rollers 21, 22, 23, and 24 of the transfer mechanism 20.

As shown in FIG. 6, the distance L between the actuators 31a and 32a of the first and second detection switches 31 and 32 is set so that both the first and second detection switches 31 and 32 are brought into an ON state (detection state) when the center of a center hole D1 of the large-diameter disk D having a diameter of 12 cm is aligned with the center of rotation of the turntable 54, in a plan view (as viewed from above). That is, the distance L is set so that both the first and second detection switches 31 and 32 are brought into a detection state when a disk is transferred to such a position as to be clamped on the turntable 54, no matter whether the disk is a small-diameter disk Ds or a large-diameter disk D. In this embodiment, an operation of clamping the large-diameter disk D on the turntable 54 and an operation of detecting the completion of the clamping operation are controlled according to the process shown in FIG. 8.

Subsequently, the large-diameter disk D is clamped on the turntable 54, the spindle motor 53 starts to rotate the disk D, and a playback or a recording operation is performed by the optical head 55. In this case, before the spindle motor 53 starts, the first moving member 6 and the second moving member 7 are moved farther apart from each other to increase the opposing distance Wx between the guide member 11 and the transfer mechanism 20, and the guide member 11 and the transfer mechanism 20 are separated from the peripheral edge of the large-diameter disk D. When a small-diameter disk Ds is driven, the guide member 11 and the transfer mechanism 20 are similarly separated from the peripheral edge of the disk Ds.

After the guide member 11 and the transfer mechanism 20 separate from the peripheral edge of the disk D and before the playback or recording operation starts, the spindle motor 53 is rotated for a short period. Since the center hole D1 of the disk D is thereby properly fitted on a positioning projection 54a of the turntable 54, the disk clamping operation can be completed reliably. This makes it possible to precisely set the height of the recording surface of the disk D and to perform a subsequent correcting operation of adjusting the height of an objective lens in the optical head 55 so as to set the distance between the objective lens and the recording surface of the disk D.

After the playback or recording operation, the large-diameter disk D may be ejected from the loading slot 83, or may be transferred into the stock section 3 so as to be held in any disk holder 41.

When an operation is performed to indicate the ejection of the disk D or the transfer of the disk D into the stock section 3, first, the setting motor M starts, the first moving member 6 and the second moving member 7 are moved closer to each other, the opposing distance Wx between the guide member 11 and the transfer mechanism 20 is decreased, and the large-diameter disk D is held between the guide member 11 and the transfer mechanism 20. In this case, according to the process shown in FIG. 10, it is determined whether or not the large-diameter disk D is held between the guide member 11 and the transfer mechanism 20. After it is determined that the large-diameter disk D is held, the driving chassis 51 of the driving unit 50 is moved down so as to release the clamping of the disk D between the turntable 54 and the clamper 56.

In order to eject the large-diameter disk D, the transfer rollers 21, 22, 23, and 24 are driven counterclockwise, and the disk D is carried toward the loading slot 83. When one of the loading-detecting switches 14 and 29 is turned on and is then turned off, it is determined that the large-diameter disk D has reached the ejecting position, and the transfer rollers 21, 22, 23, and 24 are stopped. Consequently, the large-diameter disk D is stopped with a part thereof protruding from the loading slot 83.

In order to unclamp and transfer the large-diameter disk D on the turntable 54 into the stock section 3, first, the opposing distance Wx between the guide member 11 and the transfer mechanism 20 is decreased, and the large-diameter disk D is held between the guide member 11 and the transfer mechanism 20. After the driving chassis 51 moves down and the large-diameter disk D is unclamped, the transfer mechanism 20 is driven in the loading direction so that the large-diameter disk D is transferred into a disk holder 41 disposed at a selecting position 41A, which is placed at the same height as the guide member 11 and the transfer mechanism 20, and is held therein. Subsequently, the first moving member 6 and the second moving member 7 move further apart from each other to increase the opposing distance Wx between the guide member 11 and the transfer mechanism 20, and the guide member 11 and the transfer mechanism 20 are moved to positions at which they do not touch the disk D held in the disk holder 41.

By operating a disk selector switch 70 in the face section 80 corresponding to the number of a selected disk holder 41 in the stock section 3, the disk holder 41 is moved to the selecting position 41A.

By this operation, first, the driving unit 50 recedes toward the loading side (Y2-side) so as not to touch the disk D held in the disk holder 41. Then, the guide columns 42 of the stock section 3 are driven to vertically move the disk holders 41 because of the screw grooves 42a, and are stopped when the selected disk holder 41 reaches the selecting position 41A. When the disk holder 41 at the selecting position 41A is empty, the disk D is carried into the disk holder 41 by the above-described disk loading operation.

In order to select and drive a disk from the stock section 3, by operating a disk selector switch 70 corresponding to the number of a desired disk holder 41, the disk holder 41 is vertically moved to the selecting position 41A. The disk holder 41 at the selecting position 41A is stopped at the same height as that of the guide member 11 and the transfer mechanism 20.

Subsequently, the opposing distance Wx between the guide member 11 and the transfer mechanism 20 is decreased, and the disk D in the disk holder 41 is held between the guide member 11 and the transfer mechanism 20. The driving unit 50 that has receded is moved in the Y1-direction, and is stopped at the driving position shown by a broken line in FIG. 2. Then, the transfer rollers 21, 22, 23, and 24 are rotated counterclockwise, and the disk D is withdrawn from the disk holder 41 in the Y2-direction and is clamped in the driving unit 50. The clamping operation and the detection of completion of the clamping operation are controlled according to the process shown in FIG. 9.

The control operations by the main control unit 61 will now be described.

[Operation of Clamping Disk Loaded from Loading Slot]

Figure 8:
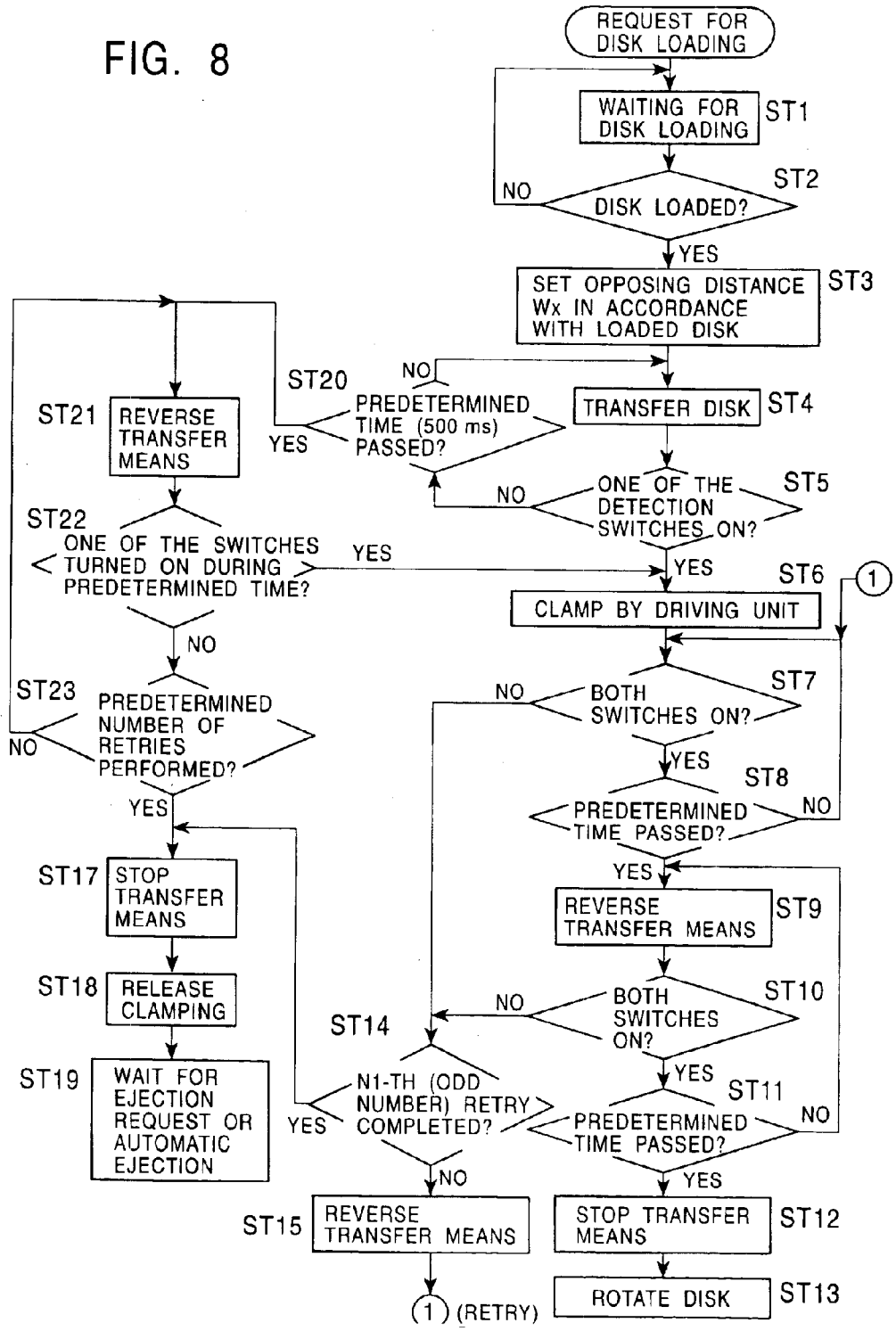
FIG. 8 is a flowchart showing a control procedure performed when detecting whether or not a disk carried from a loading slot is clamped normally.

FIG. 8 shows a process flow of a control procedure for reliably clamping a disk transferred from the loading slot 83 and loaded on the turntable 54. A large-diameter disk D having a diameter of 12 cm can be reliably clamped according to the process shown in FIG. 8.

As shown in FIG. 6, the distance L between the actuator 31a of the first detection switch 31 and the actuator 32a of the second detection switch 32 is determined so that both the first and second detection switches 31 and 32 are simultaneously turned on by both the peripheral edge of a small-diameter disk Ds and the peripheral edge of a large-diameter disk D.

As a result, in the case of the small-diameter disk Ds, when both the detection switches 31 and 32 are turned on, the center of the disk Ds and the center of rotation of the turntable 54 can be precisely aligned in the Y-direction, as viewed from above. In the case of the large-diameter disk D, when both the detection switches 31 and 32 are turned on, the center of the large-diameter disk D is placed in an area slightly wider in the Y-direction than that of the small-diameter disk Ds. However, the center hole D1 of the large-diameter disk D can be reliably fitted on the positioning projection 54a of the turntable 54 by executing the control according to the process shown in FIG. 8. That is, both the small-diameter disk Ds and the large-diameter disk D can be reliably clamped even when the first detection switch 31 and the second detection switch 32 are used to position both disks.

The process shown in FIG. 8 applies to a case in which a large-diameter disk D is clamped. In the case of a small-diameter disk Ds, as described above, after it is determined that the center of the disk Ds is aligned with the center of rotation of the turntable 54 when both the detection switches 31 and 32 are simultaneously turned on, a subsequent clamping operation is performed without executing the control shown in FIG. 8. In this case, clamping failure, such as misclamping, rarely occurs. However, such control operation may also be performed when the small-diameter disk Ds is used.

In the control operation shown in FIG. 8, an abnormal loading operation can be detected in a case in which a disk having a non-standard outer size is loaded, in a case in which a disk having a center hole of a non-standard diameter is loaded, or in a case in which a ring-shaped adapter having a diameter of 12 cm that does not hold a small-diameter disk Ds having a diameter of 8 cm in its center is loaded. Accordingly, an ejecting operation can be immediately performed in these cases.

Figure 9A:
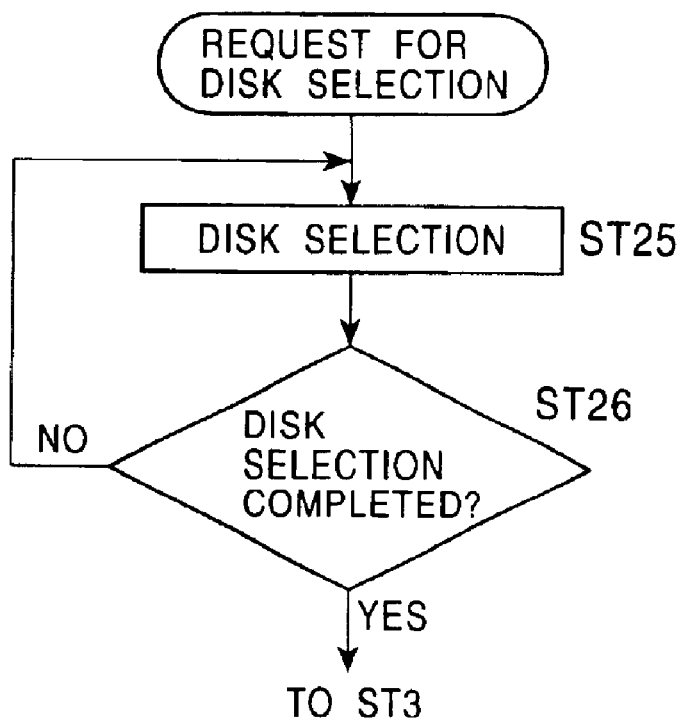
FIGS. 9A and 9B are flowcharts showing a part of a control procedure performed when detecting whether or not a disk carried from a stock section is clamped normally.
Figure 9B:
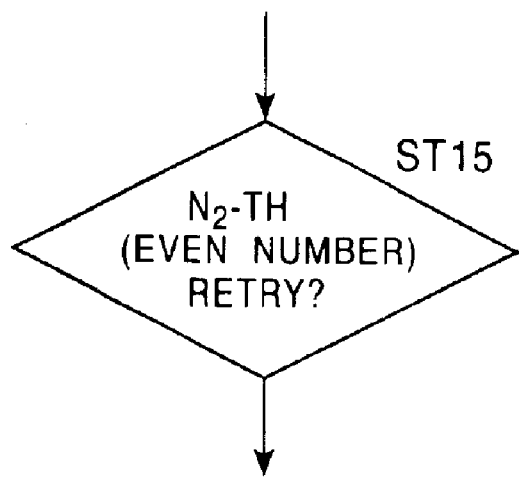
Figure 10:
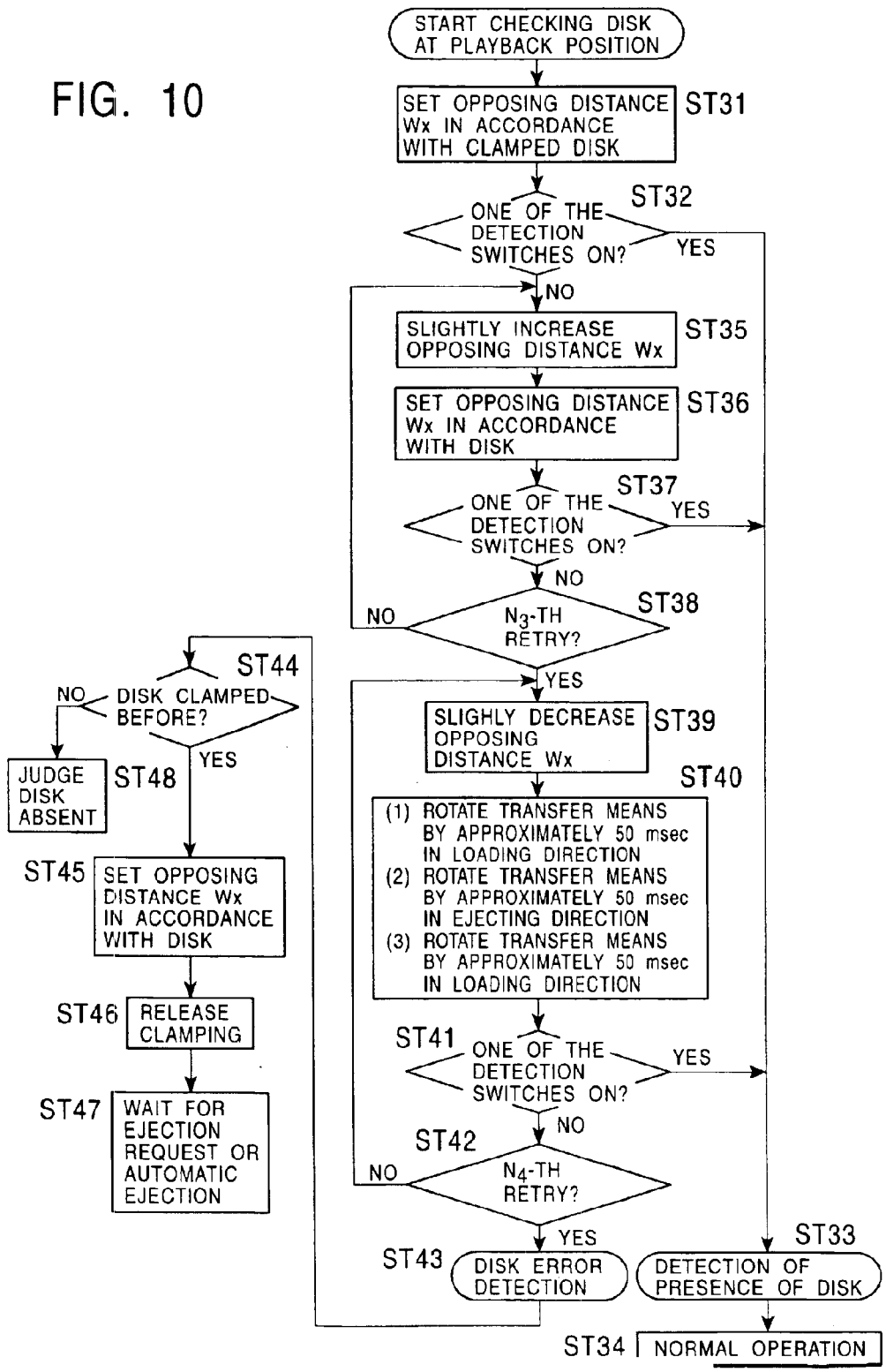
FIG. 10 is a flowchart showing a control procedure performed when holding a disk clamped on a turntable between the guide member and a transfer mechanism.

In the flowcharts shown in FIGS. 8 to 10, steps to be performed are shown as "ST".

As shown in FIG. 8, during a standby state (ST1) in which loading of a disk from the loading slot 83 is awaited, the actuation of one of the loading-detecting switches 14 and 29 is awaited. When at least one of the loading-detecting switches 14 and 29 is turned on, it is determined that a disk is loaded (ST2). When the loaded disk is a large-diameter disk D, both of the loading-detecting switches 14 and 29 are simultaneously turned on. In response, the opposing distance Wx between the guide member 11 and the transfer mechanism 20 is adjusted so as to allow the large-diameter disk D to be carried in (ST3). Then, the transfer rollers 21, 22, 23, and 24 of the transfer mechanism 20 are rotated, and the large-diameter disk D is transferred in the Y1-direction by the rotating force of the transfer rollers 21, 22, 23, and 24 (ST4).

In ST5, the actuation of one of the first detection switch 31 and the second detection switch 32 is awaited. When the actuator 31a or 32a is pressed by the peripheral edge of the disk D that is moving in the guide groove 11a of the guide member 11, and one of the detection switches 31 and 32 is turned on (detection state), a clamping operation is performed in Step ST6.

Figure 4:
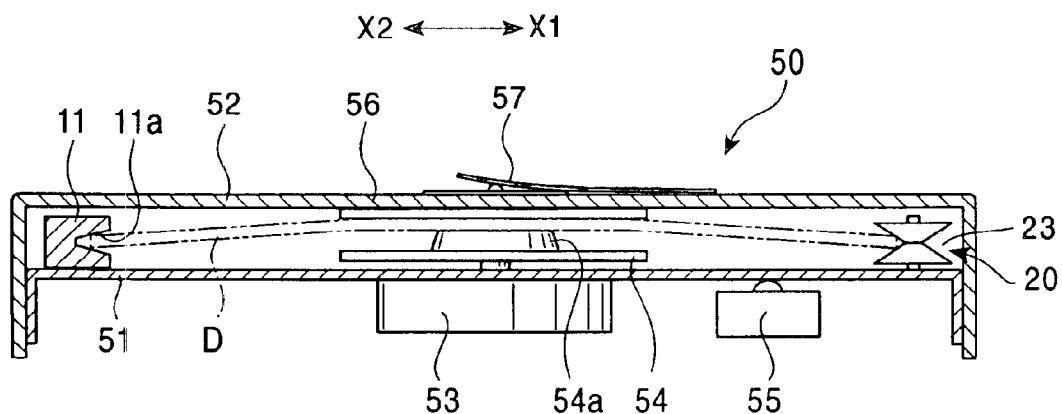
FIG. 4 is a cross-sectional view showing a state in which a rotating section is pressed against a disk.

In the clamping operation, the sliding members 65 shown in FIG. 3B are moved in the Y2-direction, the driving chassis 51 is moved up, the large-diameter disk D that is being carried is slightly bent because its center portion (adjacent to the center hole D1) is pushed up by the positioning projection 54a of the turntable 54 in a state in which both edges in the X-direction thereof are held by the guide member 11 and the transfer rollers 23 and 24, as shown in FIG. 4. The center portion of the bent disk D is pressed against the turntable 54 by an elastic resilient force. Subsequently to ST6, the disk D is transferred in the Y1-direction by the transfer rollers 23 and 24 while being bent, as shown in FIG. 4.

Figure 7:
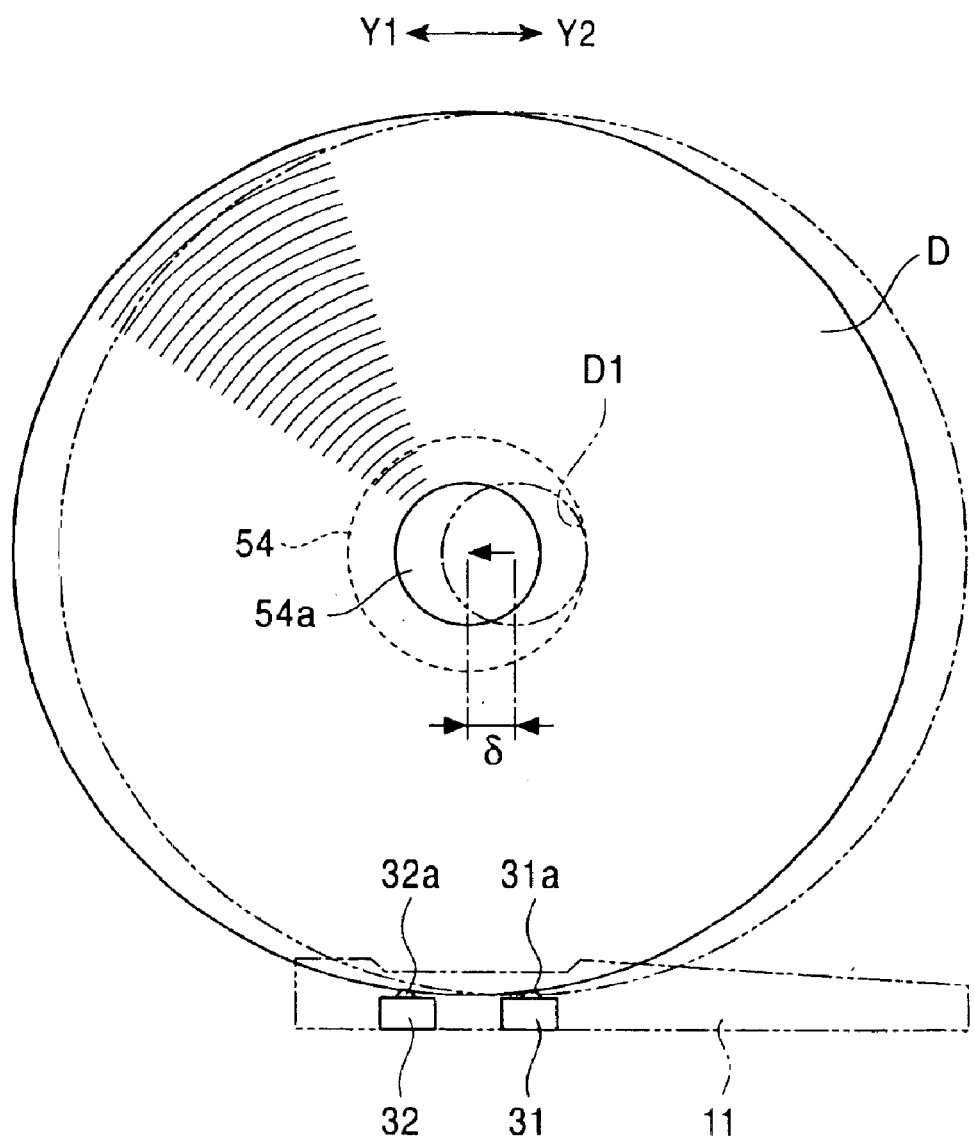
FIG. 7 is a plan view showing the relationship between a large-diameter disk that is being transferred and the detection switches.

In a case in which the conveyed disk has a standard size and the first and second detection switches 31 and 32 normally operate, the first detection switch 31 must be first turned on in ST5 while the large-diameter disk D is being transferred in the Y1-direction. In this case, as shown in FIG. 7, the center of the center hole D1 of the large-diameter disk D is placed offset by a small distance δ from the center of rotation of the turntable 54 toward the Y2-side. Therefore, when clamping operation is performed in ST6, the upper surface of the positioning projection 54a of the turntable 54 is pressed against the disk D slightly offset from the center hole D1. When the disk D further moves in the Y1-direction and the center of the disk D is aligned with the center of rotation of the turntable 54, the center hole D1 of the disk D is forcibly fitted on the positioning projection 54a of the turntable 54 by the resilient force of the bent disk D, and the clamper 56 clamps the disk D between the clamper 56 and the turntable 54 by using the force of the leaf spring 57.

In this case, the actuator 32a of the second detection switch 32 is pressed by the peripheral edge of the disk D, and both the detection switches 31 and 32 are in an ON state (detection state) in ST7. When the center hole D1 of the standard disk is fitted on the positioning projection 54a, the disk D will not move in the Y1-direction from the fitting position on the turntable 54 even when a Y1-direction transfer force of the transfer rollers 23 and 24 in the transfer mechanism 20 continuously acts on the disk D.

Accordingly, it is checked in ST8 whether or not the state in which both the detection switches 31 and 32 are ON continues for a predetermined time (for example, several hundreds of milliseconds). When it is determined in ST8 that the state had continued for the predetermined time, the transfer rollers 21, 22, 23, and 24 of the transfer mechanism 20 are reversed so as to apply an ejecting force in the Y2-direction to the disk D. In ST10, it is checked again whether or not both the first and second detection switches 31 and 32 are ON. In ST11, it is checked whether or not the state in which both the detection switches 31 and 32 are ON has continued for a predetermined time (for example, several hundreds of milliseconds). When the state continues for the predetermined time, it is determined that the center hole D1 of the disk D is reliably clamped by being fitted on the positioning projection 54a of the turntable 54.

When it is determined in ST11 that a normal clamping operation of the disk D is completed, the transfer mechanism 20 is stopped in ST12. Subsequently, the guide member 11 and the transfer mechanism 20 are separated from the peripheral edge of the large-diameter disk D, and the spindle motor 53 is driven to rotate the disk D, as described above (ST13).

A control procedure to be performed when clamping of the disk D cannot be detected will now be described.

The completion of clamping cannot be detected, for example, in a case in which both detection switches 31 and 32 are not turned on in ST7 after one of the detection switches 31 and 32 is turned on in ST5, or in a case in which both detection switches 31 and 32 are ON in ST7, and one or both of the detection switches 31 and 32 are turned off before a predetermined time to be measured in ST8 passes, that is, the state in which both detection switches 31 and 32 are ON is canceled.

A first cause of such a condition is that the disk D1 is not clamped normally although it conforms to the standard.

A second cause is that the loaded disk D1 is nonstandard, and the diameter of the center hole D1 is extraordinarily large. In such a case, even when the positioning projection 54a of the turntable 54 is fitted in the center hole of the disk, the disk is shifted by the transfer force of the transfer mechanism 20 because the center hole is too large. Consequently, it is impossible to continue the state in which both detection switches 31 and 32 are ON for a predetermined time. This also applies to a case in which a ring-shaped adapter that does not have a small-diameter disk Ds at its center is loaded.

A third cause is that one of the first detection switch 31 and the second detection switch 32 is incapable of detection due to trouble. In this case, even when the center hole D1 of the standard large-diameter disk D is normally fitted on the positioning projection 54a of the turntable 54, both of the first and second detection switches 31 and 32 will not be simultaneously turned on. Therefore, it is impossible to obtain detection information that the disk is clamped normally. In such a case, a retry is made in ST14 and subsequent steps.

In ST7 or ST10, when both detection switches 31 and 32 are not ON, Step ST14 is performed. In ST14, it is determined whether a predetermined number N1 (odd number) of retries are performed. When it is determined that N1-number of retries have not been performed, a retry process is performed.

In this retry process, first, the transfer rollers 21, 22, 23, and 24 of the transfer mechanism 20 are reversed in ST15, and it is determined in ST7 whether or not both detection switches 31 and 32 are ON. When both detection switches 31 and 32 are ON, it is checked in ST8 whether or not the ON state continues for a predetermined time. When the ON state continues for the predetermined time, Step ST9 is performed. When the disk clamping operation is completed normally, Step ST12 is performed.

When it is determined in ST14 that N1-number of retries are completed, it is determined that a clamping error has occurred, that is, that a normal clamping operation is impossible. In this case, the operation of the transfer mechanism 20 is stopped in ST17. However, the opposing distance Wx between the guide member 11 and the transfer mechanism 20 is not changed, and the disk remains held between the guide member 11 and the transfer mechanism 20. In ST18, the disk is unclamped. That is, the driving chassis 51 is moved down by operating the clamping mechanism 66 so that the disk is not retained by the turntable 54 and the clamper 56, as shown in FIG. 3A.

In ST19, the disk is automatically ejected by operating the transfer mechanism 20 in the ejecting direction. Alternatively, operations other than the disk ejecting operation are not permitted, an "error" indication is displayed on the liquid crystal display panel 81 of the face section 80, and a request for disk ejection is awaited. When an EJECT button is pressed, the transfer mechanism 20 is operated in the ejecting direction, and the disk is ejected to the loading slot 83. Alternatively, when any control button of the face section is pressed after the "error" indication is displayed on the liquid crystal display panel 81, an ejecting operation may be automatically performed by operating the transfer mechanism 20 in the ejecting direction regardless of the type of the control button.

When it is determined in ST14 that the predetermined odd number of retries are completed, the error handling process is performed in ST17 and subsequent steps. By setting the number of retries at an odd number, when the transfer rollers 21, 22, 23, and 24 of the transfer mechanism 20 are stopped in ST17, the disk D can be stopped in a state in which the center of the disk D is placed offset from the center of rotation of the turntable 54 toward the loading slot 83.

When the disk D is stopped offset from the center of rotation of the turntable 54 toward the loading slot 83 in the case of a clamping error, the transfer mechanism 20 can be operated in the ejecting direction in ST19 in a state in which the disk D is reliably held by the guide member 11 and the transfer mechanism 20. This allows the disk D to be reliably ejected after the clamping error occurs.

In a case in which one of the first detection switch 31 and the second detection switch 32 is incapable of detection due to trouble, even when a standard disk is clamped normally on the turntable 54, it is recognized that a clamping error has occurred, as described above. Therefore, when one of the detection switches 31 and 32 is faulty, the disk is reliably unclamped while being held between the guide member 11 and the transfer mechanism 20, and is then ejected.

Accordingly, the guide member 11 and the transfer mechanism 20 will not separate from the disk D and unclamp the disk D in a state in which the disk D is placed inside the disk apparatus 1. If the guide member 11 and the transfer mechanism 20 separate from the disk D although the detection switch 31 or 32 is faulty, one of the detection switches 31 and 32 does not operate normally even when the guide member 11 and the transfer mechanism 20 are moved closer to each other later. Therefore, it is impossible to detect whether or not the disk D can be normally held therebetween. Also, the main control unit 61 cannot determine that the disk is held in the driving unit 50. As a result, the disk apparatus 1 fails while the disk remains therein, and the disk cannot be ejected later.

In the procedure shown in FIG. 8, since the disk can be reliably ejected when one or both of the detection switches 31 and 32 are faulty, it is possible to prevent the disk from being left in the disk apparatus 1, as described above. When one of the detection switches 31 and 32 is faulty, an "error" indication is promptly displayed on the liquid crystal display panel 81, and therefore, the user can easily recognize that the disk apparatus 1 has a fault.

The main control unit 61 cannot detect the completion of the disk clamping operation, for example, when neither of the detection switches 31 and 32 is ON in ST5.

Such a phenomenon occurs, for example, when the loaded disk D is too thin and is transferred with its peripheral edge deviating from both the actuators 31a and 32a of the detection switches 31 and 32, as shown in FIG. 5. Similarly, when both the first and second detection switches 31 and 32 are incapable of detection due to a fault, neither of the detection switches 31 and 32 is ON in ST5.

Accordingly, it is checked in ST20 whether or not a state in which neither of the detection switches 31 and 32 is turned on continues for a predetermined time (for example, 500 ms) after the loading of the disk is detected in ST2. When it is determined in ST20 that the state continues for the predetermined time, a retry process is performed.

In the retry process, the transfer direction of the transfer mechanism 20 is reversed in ST21 so as to carry the disk toward the loading slot 83 (in the Y2-direction). In ST22, it is checked whether or not one of the detection switches 31 and 32 is turned on within a predetermined time. When one of the detection switches 31 and 32 is turned on within the predetermined time, a disk clamping operation is tried in ST6.

When neither of the detection switches 31 and 32 is turned on within the predetermined time in ST22, it is determined in ST23 whether or not a predetermined number of retries have been performed. When the predetermined number of retries have not been performed, the feeding direction of the transfer mechanism 20 is reversed in ST21. When it is determined in ST23 that the predetermined number of retries have been performed, the transfer rollers 21, 22, 23, and 24 of the transfer mechanism 20 are stopped in ST17 while the disk remains held between the guide member 11 and the transfer mechanism 20 without changing the opposing distance Wx between the guide member 11 and the transfer mechanism 20.

Then, the disk is automatically ejected in ST19, or is ejected in response to an ejection request. In this case, it is preferable that the number of retries be set in ST23 so that the disk is stopped at the position where its center is placed offset from the center of rotation of the turntable 54 when the predetermined number of retries are completed.

In the above process, for example, even when both detection switches 31 and 32 are incapable of detection due to a fault, the disk can remain held between the guide member 11 and the transfer mechanism 20. Therefore, the disk can be ejected only by operating the transfer mechanism 20 in the disk ejecting direction, or only a disk ejecting request can be accepted. This can prevent the disk from being left in the disk apparatus 1 in a state in which detection is impossible.

FIG. 9 shows a procedure for selecting a desired disk holder 41 from the stock section 3, withdrawing a disk held in the selected disk holder 41 in the Y2-direction, and clamping the disk by the turntable 54 and the clamper 56 in the driving unit 50.

As shown in FIG. 9A, when a desired disk holder 41 in the stock section 3 is selected by operating a disk selector switch 70, the guide columns 42 are driven to move the disk holder 41 to the selecting position 41A in ST25. When it is determined in ST26 that the selection of the disk holder 41 is completed, the opposing distance Wx between the guide member 11 and the transfer mechanism 20 is decreased so as to hold a large-diameter disk D therebetween in ST3 shown in FIG. 8, and the disk D held in the disk holder 41 at the selecting position 41A is held therebetween. Subsequently, a control operation of clamping the selected disk D on the turntable 54 is performed through the same process flow as in FIG. 8. In this case, however, the operating direction of the transfer mechanism 20 in ST4 is opposite to that when the disk is loaded from the loading slot 83.

When it is determined that a clamping error has occurred as the result of checking the operation of the detection switches 31 and 32, a retry is performed in ST14. A retry is also performed when it is determined that a state in which neither of the detection switches 31 and 32 is ON continues for a predetermined time in ST20. After the retry, when the disk is not clamped normally, the disk is held between the guide member 11 and the transfer mechanism 20, released from the turntable 54 and the clamper 56, and ejected. These control operations are substantially the same as those when the disk loaded from the loading slot 83 is clamped.

As shown in FIG. 9B, when a disk withdrawn from the stock section 3 is clamped, the number of retries in ST15 is set at a predetermined even number N2. The number of retries in ST23 is similarly set. By thus setting the number of retries at an even number, when a clamping error occurs, the disk is stopped at the position at which the center of the disk is placed offset from the center of rotation of the turntable 54 toward the loading slot 83. This allows the disk to be reliably ejected in the case of a disk clamping error.

After a playback or recording operation for the disk clamped by the driving unit 50 is completed, the first moving member 6 and the second moving member 7 are moved closer to each other, and the guide member 11 and the transfer mechanism 20 hold the disk clamped on the turntable 54. In this case, a small-diameter disk Ds having a diameter of 8 cm is simply ejected to the loading slot 83, and a large-diameter disk D having a diameter of 12 cm is simply ejected to the loading slot 83 or is transferred into the disk holder 41 in the stock section 3.

FIG. 10 shows a process flow of a control operation to be performed when a disk clamped on the turntable 54 is held between the guide member 11 and the transfer mechanism 20.

When the driving of a disk D by the driving unit 50 is completed, and an operation indicating the ejection of the disk D or the holding of the disk D in the disk holder 41 is performed, the first moving member 6 and the second moving member 7 are moved closer to each other in ST31, and the opposing distance Wx between the guide member 11 and the transfer mechanism 20 is set so as to hold the disk D therebetween.

In a case in which the disk clamped on the turntable 54 conforms to the standard and the detection switches 31 and 32 operate normally, when the disk D is held between the guide member 11 and the transfer mechanism 20, the first detection switch 31 and the second detection switch 32 must be simultaneously turned on. Accordingly, when at least one of the detection switches 31 and 32 is turned on in ST32 in FIG. 10, it is determined in ST33 that the disk is normally held. Then, normal operation is performed in ST34. In ST34, for example, when the operation is made to indicate the transfer of a large-diameter disk D into the disk holder 41, the disk D is released from clamping by the turntable 54 and the clamper 56, and the transfer mechanism 20 is driven to transfer the disk D into the disk holder 41 placed at the selecting position 41A.

In a case in which neither of the detection switches 31 and 32 is turned on in ST32 although the opposing distance Wx between the guide member 11 and the transfer mechanism 20 is set so as to hold the disk D therebetween, a retry is performed.

The retry includes two stages. In the first stage, the first moving member 6 and the second moving member 7 are moved farther apart from each other so as to increase the opposing distance between the guide member 11 and the transfer mechanism 20 in ST35, and the guide member 11 and the transfer mechanism 20 are separated from the peripheral edge of the disk D. In ST36, the opposing distance Wx between the guide member 11 and the transfer mechanism 20 is decreased, and an operation of holding the disk D therebetween is performed again.

In the first stage, there is a high probability of recovering from errors, for example, the peripheral edge of the disk D falling off the guide groove 11a of the guide member 11 when decreasing the opposing distance Wx between the guide member 11 and the transfer mechanism 20, or separation of the peripheral edge of the disk D from the actuators 31a and 32a of the detection switches 31 and 32, as shown in FIG. 5, because of an insufficient thickness of the disk D.

It is checked in ST37 whether or not one of the detection switches 31 and 32 is turned on. When one of the detection switches 31 and 32 is turned on, it is determined that the disk D is normally held.

In ST38, the number of first-stage retries carried out is checked. When it is determined that a predetermined number N3 (approximately three) of retries have been performed, but the completion of a normal holding operation is not detected, the first stage is finished, and the second stage is started.

In the second stage, in ST39, the opposing distance Wx between the guide member 11 and the transfer mechanism 20 is set to be slightly smaller, for example, by 0.5 mm than when the disk D on the turntable 54 is held therebetween.

In ST40, the disk D clamped on the turntable 54 is rotated at least once. The rotating operation can be performed by driving the transfer rollers 21, 22, 23, and 24 of the transfer mechanism 20, or by rotating the spindle motor 53. In ST40 shown in FIG. 10, the transfer rollers 21, 22, 23, and 24 are driven three times, that is, forward, in reverse, and forward, each for approximately 50 ms.

In ST41, it is checked whether or not one of the detection switches 31 and 32 is turned on. When at least one of the detection switches 31 and 32 is ON, it is determined that the disk D is held normally.

When neither of the detection switches 31 and 32 is ON in ST41, it is checked in ST42 whether or not a predetermined number N4 of second-stage retries have been performed. When neither of the detection switches 31 and 32 is turned on after N4-number (about three times) of retries, the second stage is completed.

In the second stage, since the opposing distance Wx between the guide member 11 and the transfer mechanism 20 is first decreased in ST39, even when the outer diameter of the disk D clamped on the turntable 54 is excessively smaller than the standard, it is possible to detect that the disk D is held between the guide member 11 and the transfer mechanism 20.

If the peripheral edge of the disk D is deformed in a corrugated shape or the disk D is partially warped, even when the peripheral edge is separated from the actuators 31a and 32a, the probability that it will press the actuator 31a or 32a can be increased by rotating the disk D in ST40.

In a case in which the normal state of the disk D is not detected (neither of the detection switches 31 and 32 is ON) after N3-number of first-stage retries and N4-number of second-stage retries, it is detected that a clamping error of the disk D has occurred (ST43).

The clamping error may occur, for example, because the disk D is extraordinarily warped, because both the detection switches 31 and 32 are incapable of detection due to a fault, or because the disk D does not lie on the turntable 54.

When it is determined in ST43 that the clamping error has occurred, an operation history of the disk apparatus 1 stored in the memory 62 of the main control unit 61 is checked in ST44. When information that the disk D has been clamped by the driving unit 50 before or immediately before the occurrence of the error is not recorded in the operation history, it is determined in ST48 that the disk D is not held on the turntable 54, and a subsequent operation by the user is accepted. That is, the operations of loading a new disk D, of selecting a disk D from the stock section 3, and of withdrawing a disk D selected from the stock section 3 into the driving unit 50 and clamping the disk D are accepted.

In ST44, when information that the disk D has been clamped by the driving unit 50 before or immediately before the occurrence of the error is recorded in the operation history, it is determined that the disk D lies on the turntable 54. In this case, the opposing distance Wx between the guide member 11 and the transfer mechanism 20 is set so as to hold the disk therebetween, and the disk D remains held therebetween. In ST46, the driving chassis 51 is moved down, and the clamping by the turntable 54 and the clamper 56 is released.

In ST47, the transfer mechanism 20 operates in the ejecting direction, and the disk D is automatically ejected to the loading slot 83. Alternatively, an "error" indication is displayed on the liquid crystal display panel 81, and the operation is stopped. After that, only an operation of pressing the EJECT button is accepted. When an operation is performed to indicate ejection, the transfer mechanism 20 is operated to eject the disk D. Alternatively, the disk D may be ejected by operating any control button in the face section 80, regardless of the type of the control button.

Thus, since the disk D remains held between the guide member 11 and the transfer mechanism 20 and only an operation of ejecting the disk D is accepted when a clamping error occurs, the probability of ejecting the disk D can be increased. For example, in a case in which the first detection switch 31 and the second detection switch 32 cannot properly operate because of a fault, the disk D is not left in the disk apparatus 1, but is ejected reliably.

Therefore, when the first detection switch 31 and the second detection switch 32 are faulty, by performing the procedure shown in FIG. 10, it is possible to sequentially move the disk holders 41 of the stock section 3 to the selecting position 41A, to sequentially eject the disks D held in the disk holders 41 to the insertion hole 83, and to thereby empty the contents of the stock section 3.

While the present invention has been described with reference to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A disk apparatus comprising:
    a guide member extending in a disk transfer direction so as to guide a disk to be transferred;
    a transfer mechanism for applying a transfer force to the disk;
    a rotating section to be fitted in a center hole of the disk transferred by said transfer mechanism so as to apply a rotating force to the disk;
    a clamp mechanism for fitting said rotating section in the center hole of the disk; and
    a control section for controlling the operation of said disk apparatus,
    wherein said guide member includes a pair of detectors arranged in the disk transfer direction and spaced apart a predetermined distance, both said detectors being brought into a detection state by a peripheral edge of the disk when the disk reaches such a position as to be clamped by said rotating section, and wherein said control section operates said clamp mechanism so that said rotating section is urged toward the disk when one of said detectors is brought into a detection state during the transfer of the disk, determines that a clamping operation of the disk is completed when both said detectors are brought into a detection state and the detection state continues for a first predetermined time, and stops said transfer mechanism in response to the determination.

2. A disk apparatus according to claim 1, wherein said control section operates said transfer mechanism so as to reverse the disk transfer direction at least once after recognizing that both said detectors are brought into the detection state, and determines that the clamping operation of the disk is completed when both said detectors maintain the detection state for a second predetermined time.

3. A disk apparatus according to claim 1, wherein a retry for operating said transfer mechanism so as to reverse the disk transfer direction at least once is performed when one of said detectors is brought into a detection state during the transfer of the disk and both said detectors are not brought into a detection state within a third predetermined time after said rotating section is urged toward the disk.

4. A disk apparatus according to claim 1, further comprising:
a stock section provided inside said disk apparatus so as to store a plurality of disks,
wherein said transfer mechanism transfers a disk selected from said plurality of disks stored in said stock section toward said rotating section.

5. A disk apparatus according to claim 1, wherein said guide member guides one side of the peripheral edge of the disk, said transfer mechanism opposes said guide member so as to apply the transfer force to the other side of the peripheral edge of the disk, said rotating section is urged toward the disk held by said guide member and said transfer mechanism so as to slightly bend the disk, and the disk is pressed against said rotating section by a resilient force of the bent disk until the disk is transferred to such a position as to be clamped on said rotating section.

6. A disk apparatus according to claim 5, wherein said guide member has a guide groove extending in the disk transfer direction so as to receive the peripheral edge of the disk, actuators of said pair of detectors project into said guide groove, and said detectors are brought into the detection state when said actuators are pressed by the peripheral edge of the disk that moves in said guide groove.

7. A disk apparatus according to claim 6, wherein said transfer mechanism holds the disk between said transfer mechanism and said guide groove of said guide member, and includes a plurality of transfer rollers that are arranged in the disk transfer direction.

8. A disk apparatus according to claim 5, further comprising:
a disk-diameter distinguishing section for distinguishing whether the disk loaded from a loading slot of said disk apparatus is a large-diameter disk or a small-diameter disk; and
a distance setting section for switching an opposing distance between said guide member and said transfer mechanism between a distance that allows a large-diameter disk to be transferred and a distance that allows a small-diameter disk to be transferred, on the basis of the result of distinction by said disk-diameter distinguishing section,
wherein a distance between said pair of detectors is determined so that said detectors are simultaneously brought into a detection state by a peripheral edge of the small-diameter disk or by a peripheral edge of the large-diameter disk, and
wherein said control section operates said clamp mechanism so as to press said rotating section against the disk when one of said detectors is brought into a detection state at least the during transfer of the large-diameter disk, and determines that the clamping operation of the disk is completed and stops said transfer mechanism when both said detectors are subsequently brought into a detection state and the detection state continues for a fourth predetermined time.

9. A disk apparatus comprising:
a loading slot;
a transfer mechanism for applying a transfer force to a disk loaded from said loading slot;
a guide member extending in a disk transfer direction so as to guide the disk transferred by said transfer mechanism;
a rotating section to be fitted in a center hole of the disk transferred by said transfer mechanism so as to apply a rotating force to the disk;
a clamp mechanism for fitting said rotating section in the center hole of the disk; and
a control section for controlling the operation of said disk apparatus,
wherein said guide member includes a pair of detectors arranged in the disk transfer direction and spaced apart a predetermined distance, both said detectors being brought into a detection state by a peripheral edge of the disk when the disk reaches such a position as to be clamped by said rotating section, and
wherein said control section operates said clamp mechanism so that said rotating section is urged toward the disk when one of said detectors is brought into a detection state during the transfer of the disk, determines that a clamping operation of the disk is completed when both said detectors are subsequently brought into a detection state and the detection state continues for a first predetermined time, and stops said transfer mechanism in response to the determination.

10. A disk apparatus according to claim 9, wherein said control section operates said transfer mechanism so as to reverse the disk transfer direction at least once after recognizing that both said detectors are brought into the detection state, and determines that the clamping operation of the disk is completed when both said detectors maintain the detection state for a second predetermined time.

11. A disk apparatus according to claim 9, wherein a retry for operating said transfer mechanism so as to reverse the disk transfer direction at least once is performed when one of said detectors is brought into a detection state during the transfer of the disk and both said detectors are not brought into a detection state within a third predetermined time after said rotating section is urged toward the disk.

12. A disk apparatus according to claim 9, further comprising:
a loading detector for detecting that the disk is loaded from said loading slot,
wherein a retry for operating said transfer mechanism so as to reverse the disk transfer direction at least once is performed when neither of said detectors for determining a clamping operation is brought into a detection state within a fourth predetermined time after loading of the disk is detected by said loading detector.

13. A disk apparatus according to claim 9, further comprising:
- a stock section provided inside said disk apparatus so as to store a plurality of disks,
- wherein said transfer mechanism transfers a disk selected from said plurality of disks stored in said stock section toward said rotating section.

14. A disk apparatus according to claim 9, wherein said guide member guides one side of the peripheral edge of the disk, said transfer mechanism opposes said guide member so as to apply the transfer force to the other side of the peripheral edge of the disk, said rotating section is urged toward the disk held by said guide member and said transfer mechanism so as to slightly bend the disk, and the disk is pressed against said rotating section by a resilient force of the bent disk until the disk is transferred to such a position as to be clamped on said rotating section.

15. A disk apparatus according to claim 14, wherein said guide member has a guide groove extending in the disk transfer direction so as to receive the peripheral edge of the disk, actuators of said pair of detectors project into said guide groove, and said detectors are brought into the detection state when said actuators are pressed by the peripheral edge of the disk that moves in said guide groove.

16. A disk apparatus according to claim 15, wherein said transfer mechanism holds the disk between said transfer mechanism and said guide groove of said guide member, and includes a plurality of transfer rollers that are arranged in the disk transfer direction.

17. A disk apparatus according to claim 14, further comprising:
- a disk-diameter distinguishing section for distinguishing whether the disk loaded from said loading slot of said disk apparatus is a large-diameter disk or a small-diameter disk; and
- a distance setting section for switching an opposing distance between said guide member and said transfer mechanism between a distance that allows a large-diameter disk to be transferred and a distance that allows a small-diameter disk to be transferred, on the basis of the result of distinction by said disk-diameter distinguishing section,
- wherein a distance between said pair of detectors is determined so that said detectors are simultaneously brought into a detection state by a peripheral edge of the small-diameter disk or by a peripheral edge of the large-diameter disk, and
- wherein said control section operates said clamp mechanism so as to press said rotating section against the disk when one of said detectors is brought into a detection state at least the during transfer of the large-diameter disk, and determines that the clamping operation of the disk is completed and stops said transfer mechanism when both said detectors are subsequently brought into a detection state and the detection state continues for a fifth predetermined time.

* * * * *